Figure 1:
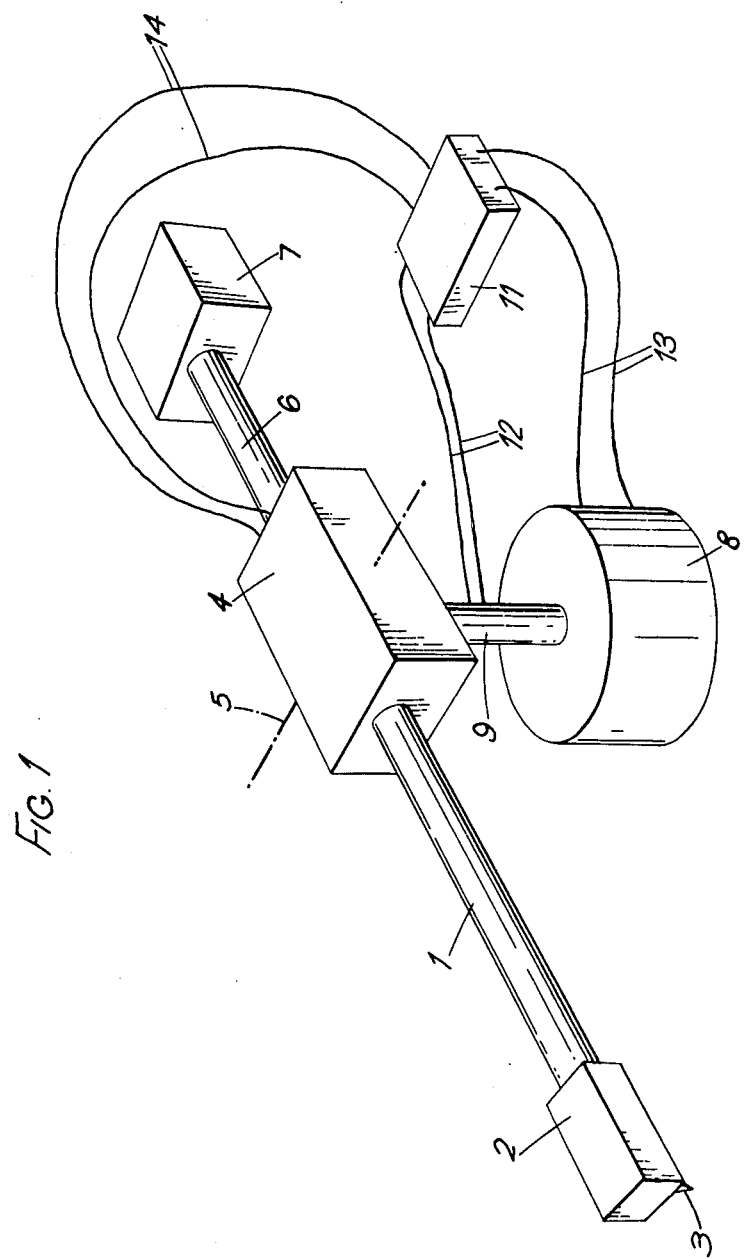

United States Patent [19]

Plummer et al.

[11] 4,105,961
[45] Aug. 8, 1978

[54] PHONOGRAPH PICK-UP ARM CONTROL ARRANGEMENT

[75] Inventors: Dexter Robert Plummer, Ongar; Roderick Frank Jones, London, both of England

[73] Assignee: Strathearn Audio Limited, Belfast, Northern Ireland

[21] Appl. No.: 635,268

[22] Filed: Nov. 25, 1975

[30] Foreign Application Priority Data

Nov. 27, 1974 [GB] United Kingdom ............... 51446/74

[51] Int. Cl.² ............................................. G05B 11/01
[52] U.S. Cl. ............................ 318/676; 179/100.41 R; 318/112
[58] Field of Search ............... 318/676, 109, 112, 113; 179/100.41

[56] References Cited

U.S. PATENT DOCUMENTS

| | | | |
|---|---|---|---|
| 2,735,973 | 2/1956 | Akerman | 318/112 |
| 2,925,544 | 2/1960 | Lang | 318/676 |
| 2,930,957 | 3/1960 | Cronberger | 318/113 |
| 3,471,655 | 10/1969 | Herve | 179/100.4 |
| 3,623,734 | 11/1971 | Sakamoto | 274/1 R |
| 3,767,848 | 10/1973 | Schuller et al. | 179/100.4 R |
| 3,830,505 | 8/1974 | Rabinow | 274/1 R |
| 3,857,081 | 12/1974 | Gebelein | 318/676 |

FOREIGN PATENT DOCUMENTS 105,587 9/1923 Fed. Rep. of Germany ............. 318/68

Primary Examiner—Robert K. Schaefer
Assistant Examiner—John J. Feldhaus
Attorney, Agent, or Firm—Cushman, Darby & Cushman

[57] ABSTRACT

This invention relates to arrangements for use in controlling the movement of a pivoted arm and it has particular, though not exclusive, application in controlling the movement of a phonograph pick-up arm.

4 Claims, 3 Drawing Figures

PHONOGRAPH PICK-UP ARM CONTROL ARRANGEMENT

It is known to control the pressure of a stylus on a pick-up arm upon the surface of a phonograph record by the use, for example, of an adjustable counter-balance weight acting on the opposite side of the horizontal pivot axis of the pick-up arm to the stylus.

The present invention provides electric circuit control arrangements which can be used in controlling the pressure of the stylus of a pick-up arm upon the surface of a phonograph record and/or in raising and lowering the stylus from the surface of a record.

It is a requirement that the vertically applied or tracking weight and the rotational or bias pressure of a stylus against a record groove be carefully adjusted.

The tracking weight should be just sufficient to make the stylus stay in contact with both walls of the groove even when there is heavy modulation and the record is not perfectly flat. Too little tracking weight will allow the stylus to lose contact and hence give a false reproduction of the recorded signal. Too much tracking weight causes excessive wear of both record and stylus. If the bias correction force is too much or too little, then the tracking weight has to be increased to achieve "tracking" (continuous contact with both walls of the groove).

To a close approximation the optimum bias correction is a fraction of the tracking weight, where this fraction is primarily a function of the stylus geometry (spherical, bi-radial, Shibata, multi-radial).

The adjustment is normally carried out by playing a test record and adjusting the tracking weight and the bias correction until the best condition is obtained.

This is a very difficult and laborious process as with the usual magnetic or mechanical arrangements, the stylus must be lifted from the record to make an adjustment, so that an iterative trial and error process with the two input variables is necessary.

Figure 2:
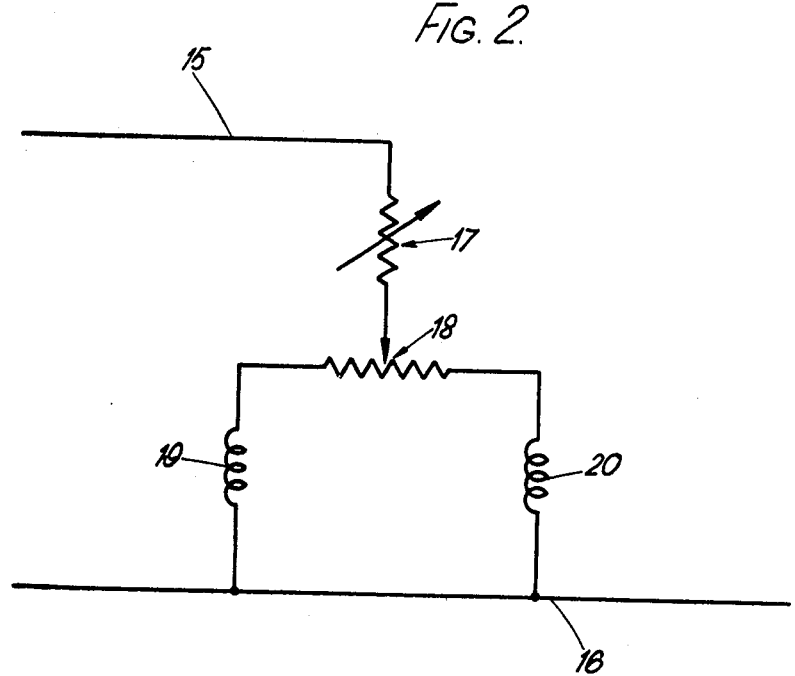
Figure 3:
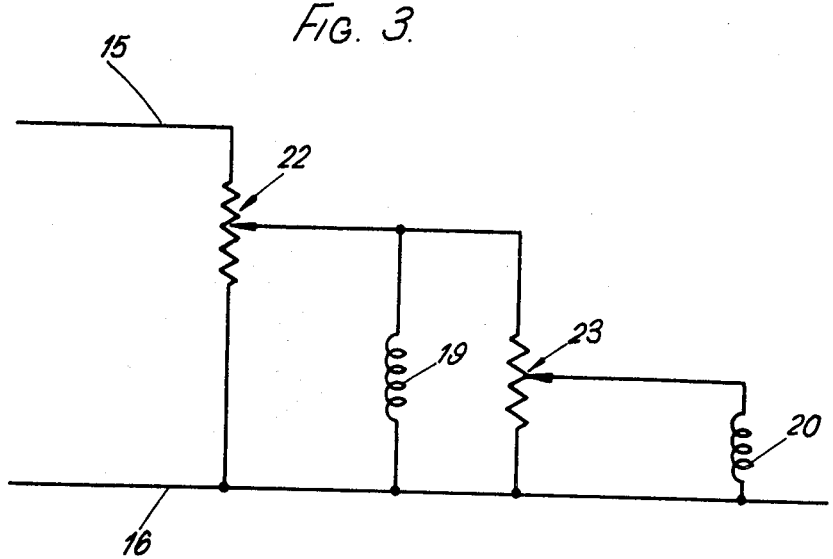

Embodiments of the invention will now be described, by way of example, with reference to the accompanying drawings in which:

FIG. 1 is a perspective schematic view of a pivoted pick-up arm and control arrangement and FIGS. 2 and 3 are electric circuit diagrams of arrangements for use in controlling a pick-up arm such as that shown in FIG. 1.

Referring to FIG. 1, there is shown a phonograph pick-up arm 1 having, at one end, a head 2 which carries a stylus 3. At its other end the arm 1 extends from a vertical movement control arrangement 4 (such as that described in co-pending patent application Ser. No. 874,484 filed Oct. 28, 1975 and assigned to the assignee in respect to the present application) and pivoted for vertical movement about a horizontal axis 5. Extending from the opposite side of the control arrangement 4 is an arm 6 carrying a counter-balance weight 7. The arms 1 and 6 and the control arrangement 4 are rotatable horizontally under the control of a bias motor device 8 acting through a shaft 9. The bias motor device 8 can be a motor similar to that of a moving coil instrument, although other types of motor can be used.

Power is fed from a control unit 11 to a coil or coils of the vertical or tracking control arrangement 4 via leads 14 and to the horizontal rotational or bias motor device 8 via leads 13. It may be arranged that the power fed to the control arrangement 4 and the motor device 8 from the control unit 11 is increased in accordance with an increase in the amplitude of the signal from the head 2 via leads 12 so that, during passages of higher modulation than normal, the bias and tracking forces applied to the stylus are increased in order to retain the stylus in contact with the groove during these passages.

In order to enable these forces to be adjusted easily during the playing of a record, the present invention provides a circuit arrangement for use in controlling the amount of current fed to the tracking force control arrangement 4 and the bias motor device 8, which can easily be incorporated in the control unit 11.

Referring to FIG. 2, there is shown a first circuit which is suitable for use in controlling the flow of current to the arrangement 4 and the device 8. The circuit, which is connected between power supply rails 15 and 16, includes a variable resistor 17, one end of which is connected to the moving contact of a potentiometer 18. The ends of the resistance element of the potentiometer 18 are connected respectively to one end of a coil 20 in the bias motor device 8 and one end of a coil 19 in the tracking control arrangement 4.

It will be seen that, by varying the value of the resistor 17, it is possible to vary the amount of power fed to the coils 19 and 20 and that, by varying the position of the moving contact of the potentiometer 18, the ratio in which the power is fed to the two coils 19 and 20 can be varied.

Referring to FIG. 3, there is shown a second circuit which is suitable for use in controlling the flow of current to the arrangement 4 and the device 8. The circuit, which is connected to power supply rails 15 and 16, includes a potentiometer 22, whose resistance element is connected between the supply rails 15 and 16. The coil 20 of the bias motor device 8 is connected in parallel with the resistor of a second potentiometer 23 between the moving contact 24 of the potentiometer 22 and the supply rail 16. The coil 19 of the tracking control arrangement 4 is connected between the moving contact 25 of the potentiometer 23 and the rail 16.

It will be seen that, with this circuit also, the amount of power fed to the coils 19 and 20 can be varied by varying the position of the moving contact on the element of the potentiometer 22, without substantially varying the ratio of the power fed to them and that the ratio of the power fed to the two coils 19 and 20 can be varied by varying the position of the moving contact on the resistance element of the potentiometer 23.

Assuming that the ratio of the current flow between the two coils is set-up correctly initially, it is thus only necessary to adjust the resistor 17, in the case of the first circuit, or the potentiometer 22, in the case of the second circuit, in order to adjust the normal forces acting on the stylus 3, thereby making it possible to conserve both the record and the stylus life easily. Of course, the level at which power is supplied to the rails 15 and 16 can easily be varied in accordance with the level of the output signal from the head 2 in the way described in our co-pending patent application Ser. No. 874,484 filed Oct. 28, 1975 and assigned to the assignee of the present application.

It will be understood that, although the invention has been described with reference to particular embodiments by way of example, variations and modifications can be made within the scope of the invention. For example, instead of using a variable resistor as a control element some other known variable control device, such as an amplifier, could be used.

We claim:

1. A circuit arrangement for use in controlling the movement of a pivoted tone arm for a phonograph arm in first and second planes including first and second motors controlling the movement of the arm in the respective planes, a drive element in each motor, means including terminals to connect the drive elements to a source of power, first adjustable means comprising a first potentiometer connected between a terminal of the connection means and the drive elements to determine the total amount of power fed respectively to each of the drive elements from the source of power, and second adjustable means comprising a second potentiometer connected to said first potentiometer and to said drive elements for varying the ratio of the power fed to the two respective elements, the pivot axes of the arm in the first and second planes passing through one of the motors.

2. A circuit arrangement as claimed in claim 1 wherein, a terminal of the connection means is connected to a moving contact of the first potentiometer for connection to the source and a respective one of the ends of the potentiometer resistor element being connected to a respective one of the drive elements.

3. A circuit arrangement as claimed in claim 1 wherein, the terminals of the connection means for connection to the source are connected to respective ones of the ends of the resistor element of the first potentiometer, the moving contact of the first potentiometer being connected to the drive element of the first motor and to one end of the resistor element of the second potentiometer and the moving contact of the second potentiometer being connected to the drive element of the second motor.

4. A circuit arrangement as claimed in claim 1 including a variable resistor connected between the said adjustable means and a terminal of the connection means.

* * * * *